US012205306B2

(12) United States Patent
Lin et al.

(10) Patent No.: US 12,205,306 B2
(45) Date of Patent: Jan. 21, 2025

(54) SYSTEM AND METHOD FOR MULTIPLE OBJECT TRACKING (71) Applicant: International Business Machines Corporation, Armonk, NY (US)

(72) Inventors: Chung-Ching Lin, Yorktown Heights, NY (US); Rogerio Feris, Yorktown Heights, NY (US); Honghui Shi, Yorktown Heights, NY (US); Quanfu Fan, Cambridge, MA (US); Lisa Brown, Yorktown Heights, NY (US); Mandis Beigi, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 16/191,759

(22) Filed: Nov. 15, 2018

(65) Prior Publication Data

US 2020/0160060 A1 May 21, 2020

(51) Int. Cl.
*G06K 9/00* (2022.01)
*G06F 18/21* (2023.01)
*G06N 5/04* (2023.01)
*G06N 20/00* (2019.01)
*G06T 7/277* (2017.01)
*G06V 10/776* (2022.01)
*G06V 10/82* (2022.01)
*G06V 20/40* (2022.01)

(52) U.S. Cl.
CPC ............ *G06T 7/277* (2017.01); *G06F 18/217* (2023.01); *G06N 5/04* (2013.01); *G06N 20/00* (2019.01); *G06V 10/776* (2022.01); *G06V 10/82* (2022.01); *G06V 20/41* (2022.01); *G06V 20/46* (2022.01)

(58) Field of Classification Search
None
See application file for complete search history.

(56) References Cited

U.S. PATENT DOCUMENTS

| 7,095,786 | B1* | 8/2006 | Schonfeld | H04N 19/20 375/E7.076 |
| 8,098,891 | B2 | 1/2012 | Lv et al. | |
| 11,284,041 | B1* | 3/2022 | Bergamo | G06T 7/251 |
| 2005/0105765 | A1 | 5/2005 | Han et al. | |
| 2011/0193978 | A1* | 8/2011 | Wu | G06T 7/207 348/208.6 |
| 2013/0114703 | A1* | 5/2013 | DeForest | H04N 19/20 375/240.08 |
| 2017/0286774 | A1 | 10/2017 | Gaidon | |

OTHER PUBLICATIONS

Seo et al., "Effective and efficient human action recognition using dynamic frame skipping and trajectory rejection", Image and Vision Computing 58 (2017) 76-85 (Year: 2017).*

(Continued)

*Primary Examiner* — S J Park
(74) *Attorney, Agent, or Firm* — Jeffrey M. Ingalls (57) ABSTRACT A system and a method for tracking a plurality of objects, including obtaining input data, estimating a number of skipping frames of the input data based on information from the input data, predicting results based on the estimating of the number of skipping frames, and correcting the predicted results.

18 Claims, 9 Drawing Sheets (56) References Cited

OTHER PUBLICATIONS

Mel, et al. "The NIST Definition of Cloud Computing". Recommendations of the National Institute of Standards and Technology. Nov. 16, 2015.
C. Ma, "Trajectory Factory: Tracklet Cleaving and Re-connection by Deep Siamese Bi-GRU for Multiple Object Tracking." (Submitted on Apr. 12, 2018). https://arxiv.org/abs/1804.04555.
R. Fan, "Robust tracking-by-detection using a selection and completion mechanism." Comp. Visual Media (2017) 3: 285-294. https://doi.org/10.1007/s41095-017-0083-7.
M. Jiang, "Multiple Object Tracking in Videos Based on LSTM and Deep Reinforcement Learning."Complexity, 2018, https://www.hindawi.com/journals/complexity/aip/4695890/.
Y. Zhang, "Fast multi-object tracking using convolutional neural networks with tracklets updating," 2017 International Conference on Security, Pattern Analysis, and Cybernetics (SPAC), Shenzhen, 2017, pp. 313-317.
H. Kieritz, "Joint detection and online multi-object tracking." The IEEE Conference on Computer Vision and Pattern Recognition (CVPR) Workshops, 2018, pp. 1459-1467. http://openaccess.thecvf.com/content_cvpr_2018_workshops/w29/html/Kieritz_Joint_Detection_and_CVPR_2018_paper.html.
X. Wan, "Multi-Object Tracking Using Online Metric Learning with Long Short-Term Memory," 2018 25th IEEE International Conference on Image Processing (ICIP), Athens, Greece, 2018, pp. 788-792.
He A. et al., "A Twofold Siamese Network for Real-Time Object Tracking", Proceedings of the IEEE Conference on Computer Vision, 2018, 4834-4843 pp.
Held D. et al., "Learning to Track at 100 FPS with Deep Regression Networks", Retrieved from: https://davheld.github.io/GOTURN/GOTURN.html, Aug. 16, 2016, 26 pages.
Yun S. et al., "Action-Decision Networks for Visual Tracking with Deep Reinforcement Learning", IEEE Conference on Computer Vision and Pattern Recognition (CVPR), Jul. 21-26, 2017, Nov. 9, 2017, 2711-2720 pp.
Zhang D. et al., Deep Reinforcement Learning for Visual Object Tracking in Videos, Department of Computer Science, University Apr. 10, 2017, 10 pages.

* cited by examiner

SYSTEM AND METHOD FOR MULTIPLE OBJECT TRACKING

This invention was made with Government support under D17PC00341 awarded Intelligence Advanced Research Projects Activity (IARPA). The Government has certain rights in this invention.

BACKGROUND OF THE INVENTION

Field of the Invention

The disclosed invention relates generally to an embodiment of tracking, and more particularly, but not by way of limitation, relating to a system and method for multiple object tracking.

Description of the Background Art

During the data explosion era, video data increase dramatically in every aspect. Personal devices such as cell phones including smart phones, tablets, and other personal devices. Social media increased in popularity with a variety of social networking sites that encompassed image and video sharing. Home surveillance systems have increased in use with an array of video access. Increasing entertainment options include streaming of movies, shows, sporting events and other events. Public safety area includes surveillance, body-worn camera, and UAV (unmanned aerial vehicle) cameras being used.

Video processing is very important and covers many topics including detection, segmentation, tracking, video understanding, etc. Tracking is a key component to help video analysis with efficiency including detection and segmentation are expansive. In addition, tracking is an important component to help video analysis with a profound understanding including assigning identity to objects and provide temporal information.

Although tracking objects is a well-established problem in computer vision, it still remains a challenging task and there is a great need for better solutions with the ever-increasing demand for video or video streaming data.

SUMMARY OF INVENTION

In view of the foregoing and other problems, disadvantages, and drawbacks of the aforementioned background art, an exemplary aspect of the disclosed invention provides a system and method for multiple object tracking.

One aspect of the present invention is to provide a method of method of tracking a plurality of objects, including obtaining input data, estimating a number of skipping frames of the input data based on information from the input data, predicting results based on the estimating of the number of skipping frames, and correcting the predicted results.

Another aspect of the present invention provides system for tracking multiple objects, including a network including a memory storing computer instructions, and a processor configured to execute the computer instructions to obtaining input data, estimating a number of skipping frames of the input data based on information from the input data, predicting results based on the estimating of the number of skipping frames, and correcting the predicted results.

Another example aspect of the disclosed invention is to provide a computer program product including a computer readable storage medium having program instructions embodied therewith, the program instructions readable and executable by a computer to cause the computer to perform a method, including obtaining input data, estimating a number of skipping frames of the input data based on information from the input data, predicting results based on the estimating of the number of skipping frames, and correcting the predicted results.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

DETAILED DESCRIPTION OF PREFERRED EMBODIMENTS

The invention will now be described with reference to the drawing figures, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

As mentioned above, although tracking objects is a well-established problem in computer vision, it still remains a challenging task. The majority of existing solutions to the multi-object tracking problem realize the tracker by scaling up a single tracker on each object. Motion and occlusion reasoning cues are combined in a coherent end-to-end fashion over a long period of time.

Figure 1:
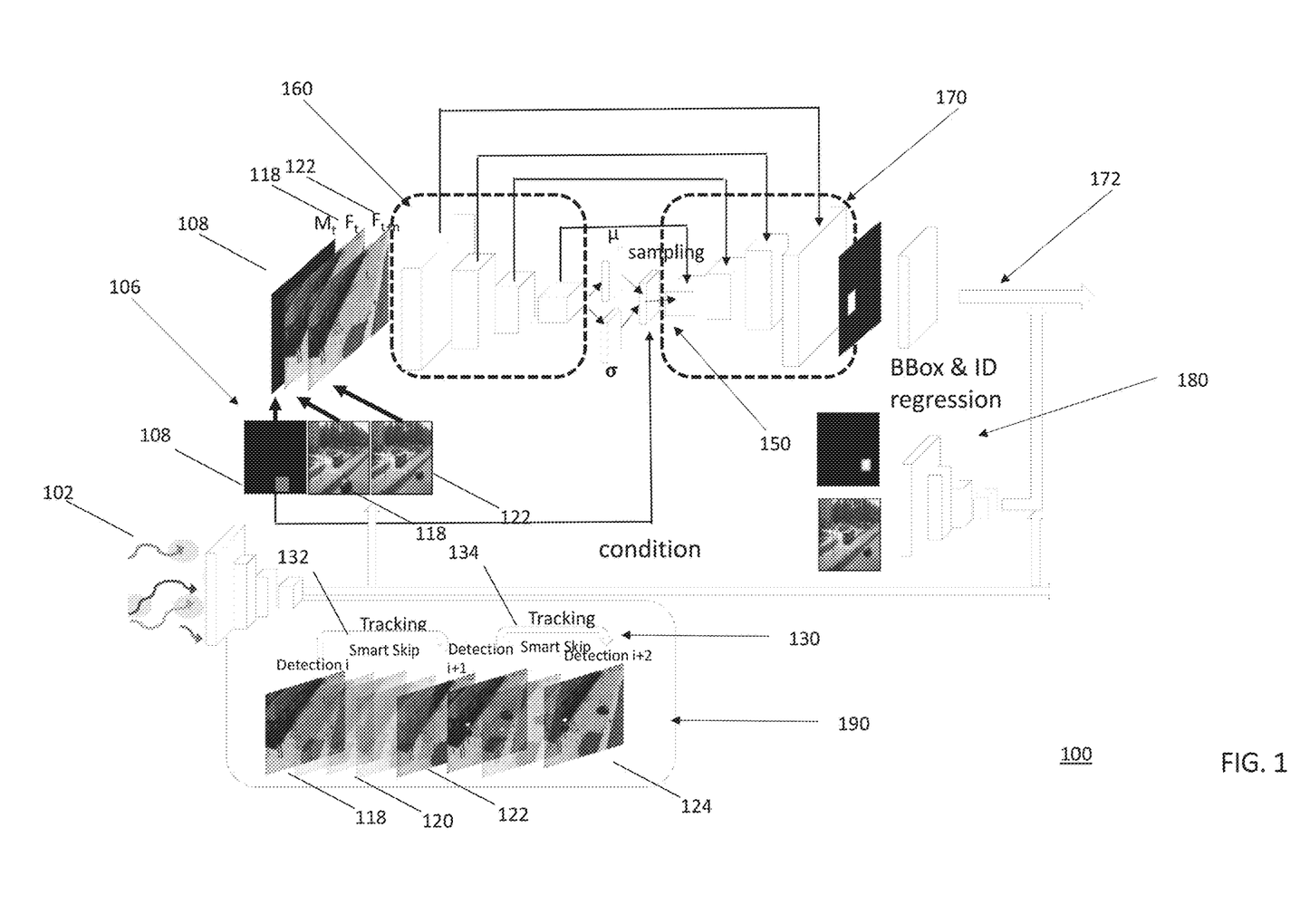
FIG. 1 is an illustration of the multi-object tracking system of an example embodiment.

FIG. 1 is an illustration of the multi-object tracking system of an example embodiment. In the present technique, the problem is approached from a different perspective. One of the objects is to use a neural network 100 to perform multiple object tracking by processing all objects altogether and jointly estimate the locations and IDs of the objects in next step. The network 100 is expected to perform well in the presence of object occlusions, object appearance changes, etc.

A probabilistic network is developed to learn a complex model of object interactions. One of the features is to estimate object states jointly over time. Additionally, there is also an inference model which will learn how many frames to skip based on the detected objects' trajectories. The smart frame skipping framework 190 is used to improve the tracking efficiency while maintaining (or even improve) the accuracy.

In essence, the present tracker proposes a new way to tackle multiple object tracking in different perspectives.

Given the bounding box initialization in the first frame 108, the neural network 100 (which can also be any of the hardware and software embodiments shown in FIGS. 5 through 9) begins from extracting features in the previous states and uses it to propose candidate object locations and IDs (Identities) in the latter frames. The network 100 to perform the joint inference is a conditional variational auto-encoder with skip connections (CVAE (conditional variational auto encoder) with skip connection or variational U-net (a convolutional neural network with U-shaped architecture)).

To improve the performance of object state estimations, an extra layer of bounding box regression 180 is incorporated after the output of the variational U-net to refine the performance. The Bounding Box Regressors 180 are helpful because the initial region proposals might not fully coincide with the region that is indicated by the learned features of the Convolutional Neural Network. An attention mechanism is also potentially included.

Figure 2:
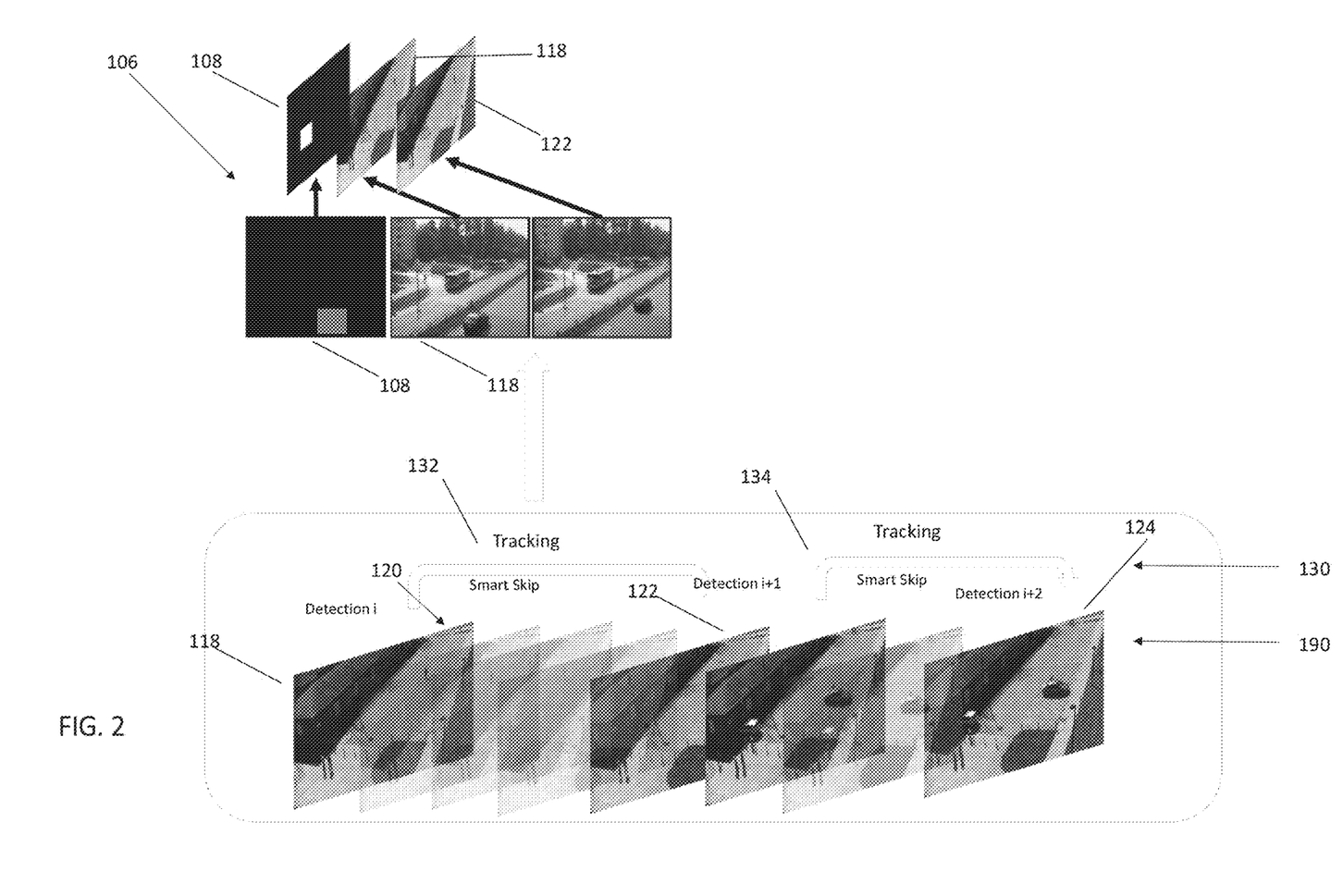
FIG. 2 illustrates skipping framework of an example embodiment.

FIG. 2 illustrates skipping framework of an example embodiment.

Referring to FIGS. 1 and 2, for the smart skip framework 190, the input is the trajectories of tracklets 102 and output is the number of skipping frames 106. Tracklets 102 can be, for example, the objects in the video. The tracklets are based on co-occurrence of multiple parts (e.g., automobile parts would be tire, trunk, steering wheel, plates, etc.) of the object, so that the object can be tracked even when it is not fully in view of the camera (e.g., part of the objects is facing a different direction or occluded by other objects, etc.). Therefore, the tracklet can be used to identify new objects of interest entering a scene.

There is a bounding box initialization in the first frame 108, the network 100 begins from extracting features in the previous states and uses it to propose candidate object locations and IDs (Identifications) in the latter frames (such as frames 122 and 124).

A shape has a reference frame and a bounding box, as does every object. The reference frame or coordinate frame can be located at the geometric center of the shape and indicates the point where the shape's position and orientation are calculated from. The coordinate frame can have an x and y axis, for example. For example, the shape's bounding box can be centered around the shape's reference frame and can have the same orientation as the reference frame (x and y axis can have the same orientation as the bounding box's edges). A three-dimensional image can also be made with x, y and z axis. The bounding box can encompass entirely the shape.

Therefore, the bounding box initialization is shown in the first frame 108, and then the network 100 extracts features and uses it to propose locations and IDs (Identifications) of the objects in the latter frames 122, 124.

The states of objects on the skipped frames 120 are simply linearly interpolated with the estimation results. Reinforcement learning is used to train the network 100. The decision will be rewarded by the larger step of skipping, estimated and interpolated object states with high IOU (intersection-over-union). A correction network is used to analyze tracking results and provide guidance for correction. Correction could yield new detection results or provide status adjustment.

During the tracking 130, objects can be detected at frame "i" 118, "i+1" 122 and "i+2" 122, where i is an integer. During the smart skips 132 and 134, frames 120 are skipped.

The first frame 108 at $M_t$ has a bounding box initialization, the detected frame $F_t$ 118 at time t, and then detected frame $F_{t+n}$ 122 at time t+n, where t and n are integers. The network 100 has convolution layers 160 and de-convolution layers 170.

Figure 3:
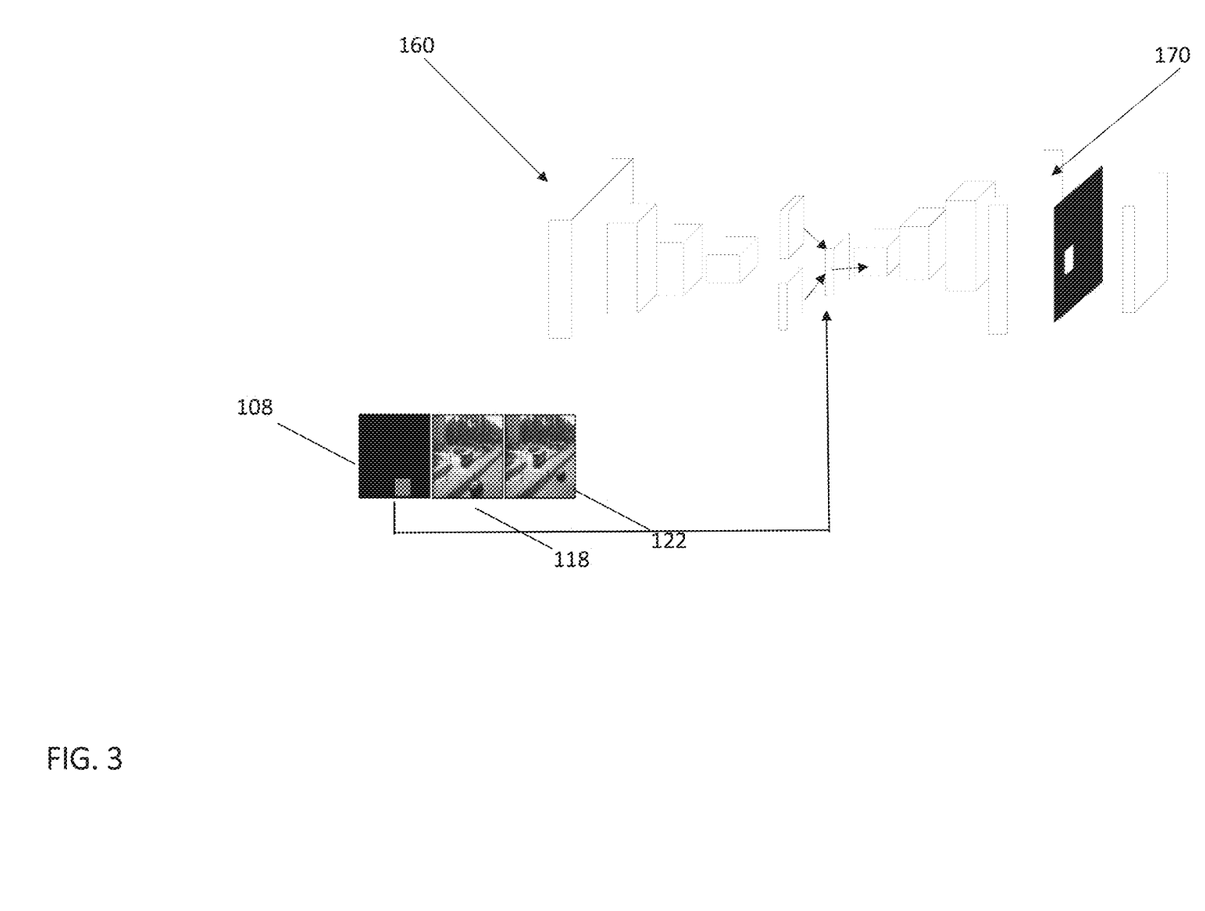
FIG. 3 illustrates the convolution and deconvolution of the example embodiment.

FIG. 3 illustrates the convolution and deconvolution of the example embodiment. Referring to FIGS. 1 and 3, the convolution layers 160 corresponds to feature extractor that transforms the input image to multidimensional feature representation, whereas the deconvolution layers 170 are a shape generator that produces object segmentation from the feature extracted from the convolution layers 160.

Based on the condition of the initial bounding box 108 of the skipping framework 190, the sampling is performed 150.

Therefore, in order to improve the performance of object state estimations, an extra layer of bounding box and ID (identification) regression 180 is incorporated after the output of the variational U-net 172 to refine the performance.

Figure 4:
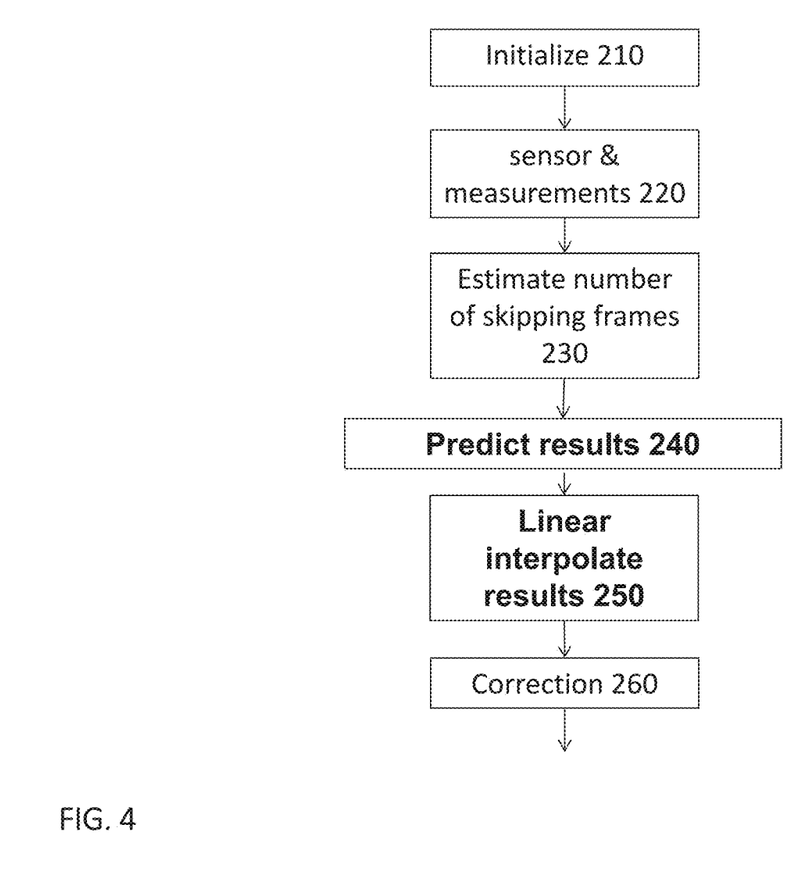
FIG. 4 illustrates a flow diagram of the multi-object tracking of an example embodiment.

FIG. 4 illustrates a flow diagram of the multi-object tracking of an example embodiment. The network 100 is initialized in step 210 that initializes the system. The bounding box is initialized in the first frame 108.

Then sensor and measurements are performed in step 220 to generate the input of the trajectories of tracklets 102. There is an estimate of the sensed (physical) entities and sensors from two or more measurements sensed from one or more sensors including assuming initial estimates from entities and sensors. Then the system 100 independently refines the entity and sensor status from the previous results.

Then, there is an estimate of the number of skipping frames 132, 134 in step 230. The predicted estimation results are made in step 240 by the system 100. The system 100 jointly estimates the locations and IDs of the objects. Therefore, the system 100 is able estimate object states jointly over time. As mentioned, one of the features is to estimate object states jointly over time. Additionally, there is also an inference model which will learn how many frames to skip based on the detected objects' trajectories from the tracklets 102.

Then, the system 100 generates linear interpolate results in step 250. The states of objects on the skipped frames are simply linearly interpolated with the estimation results 240.

Then, a correction is made in step 260. A correction network is used to analyze tracking results and provide guidance for correction. Correction could yield new detection results or provide status adjustment. Therefore, a correction or refinement 260 is made of the prediction results 240.

As mentioned reinforcement learning is used to train the network 100. Thereby, the decision will be rewarded by the larger step of skipping, estimated and interpolated object states with high IOU (intersection-over-union).

Thereby, the neural network system 100 is able to perform multiple object tracking by processing all objects altogether and jointly estimate the locations and IDs of the objects in next step. The system 100 is able to provide an inference model which will learn how many frames to skip 132, 134 based on the detected objects' trajectories 102. The smart frame skipping framework 190 is used to improve the tracking efficiency while maintaining and even improving the accuracy.

The network 100 can be pretrained on video dataset (e.g., ImageNet Video), then further trained and tested on multiple object tracking (e.g., MOT), multi-modal framework (DIVA (Document, Image and Voice Analysis Group) datasets. The network 100 can be divided to include a prediction and correction network. The tracking can include instance segmentation. There can also be unsupervised segmentation learning (detection→segmentation).

Thus, there can be a system and method of predict semantic analysis (detection/segmentation) results given initial results, assuming initial results from detection/segmentation results. and consider a single or multiple detection/ segmentation results. There can also be a system and method of predict how many frames to skip for tracking or detection. Additionally, there can be a system and method of correct/ refine the prediction results. Moreover, there can be a system and method of estimating the sensed (physical) entities and sensors from two or more measurements sensed from one or more sensors, including assuming initial estimates from entities and sensors, and independently refining the entity and sensor status from the previous results.

Additionally, the same method shown above can be used to speed up a plurality of other video recognition processes, e.g., object detection and segmentation, etc. Therefore, the disclosure is not limited to the uses shown in the above examples as the techniques shown can be used in a wide array of video recognition processes.

Different embodiments of the network system 100 is provided as follows.

Figure 5:
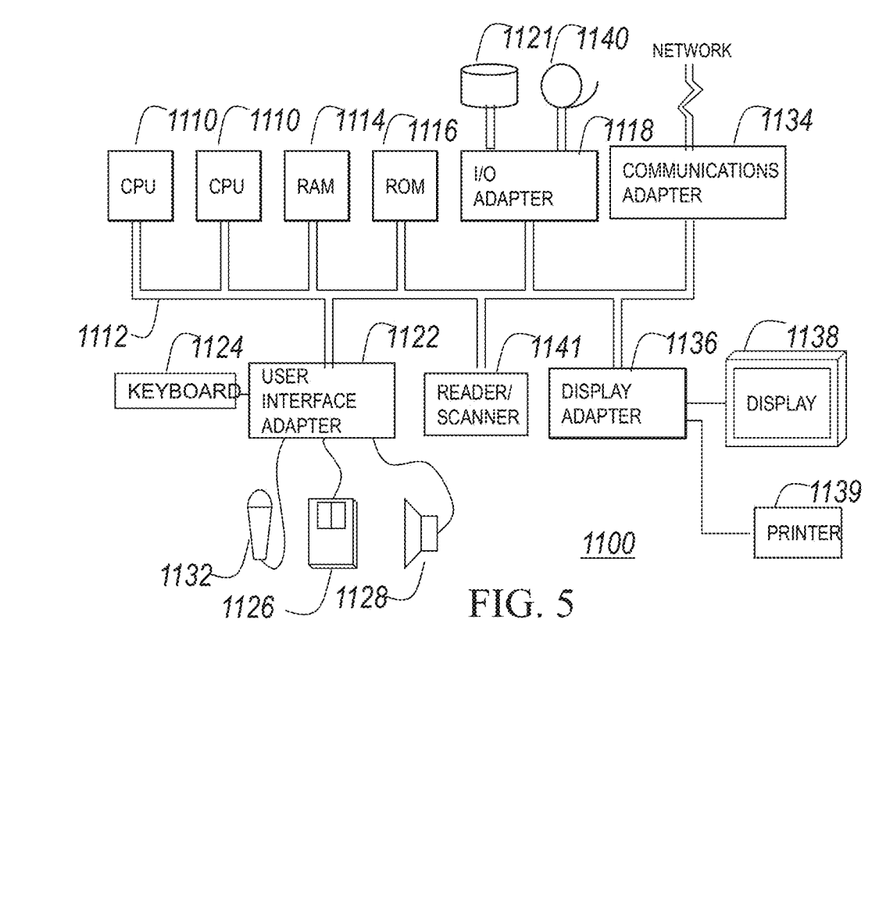
FIG. 5 illustrates an example hardware/information handling system for incorporating the example embodiments of the invention therein.

FIG. 5 illustrates a hardware configuration of an information handling/computer system 1100 in accordance with the present invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Alternatively, the instructions may be contained in another signal-bearing storage media 1200, such as a magnetic data storage diskette 1210 or optical storage diskette 1220 (FIG. 6), directly or indirectly accessible by the CPU 1210.

Figure 6:
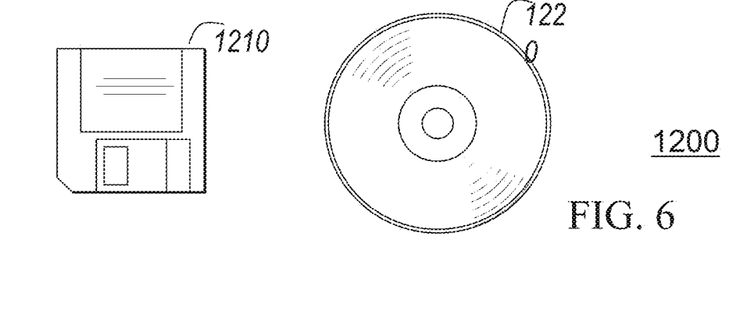
FIG. 6 illustrates a signal-bearing storage medium for storing machine-readable instructions of a program that implements the method according to the example embodiment of the invention.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
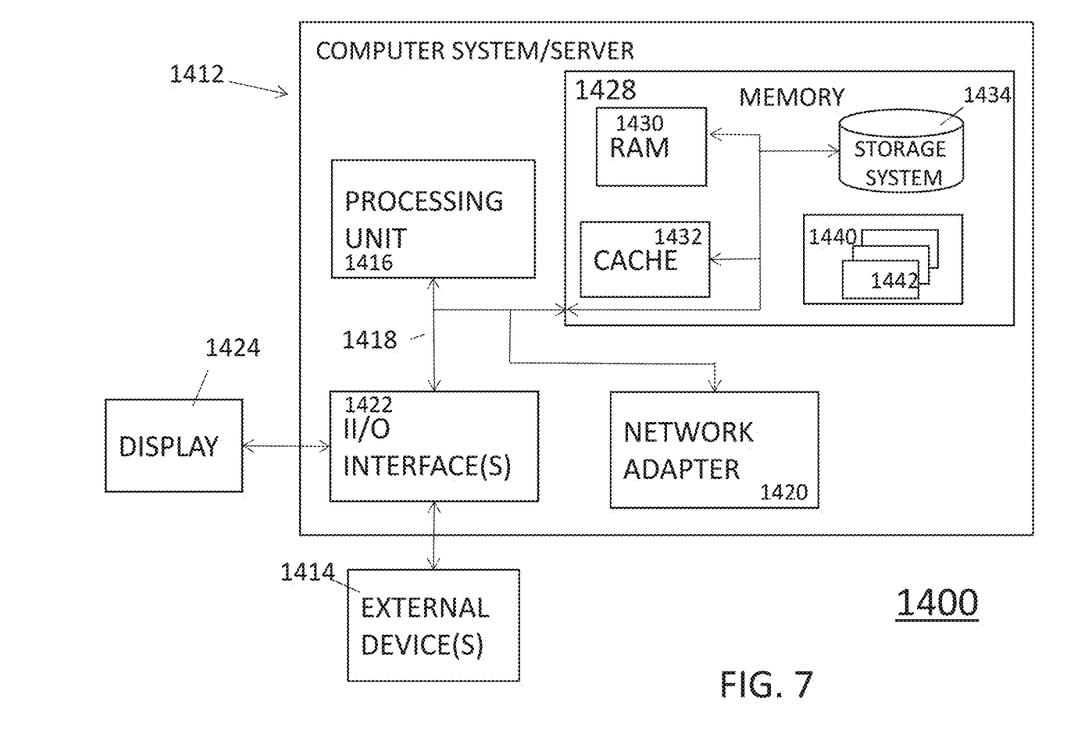
FIG. 7 depicts a cloud computing node according to an embodiment of the present invention.

Referring now to FIG. 7, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random-access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 8:
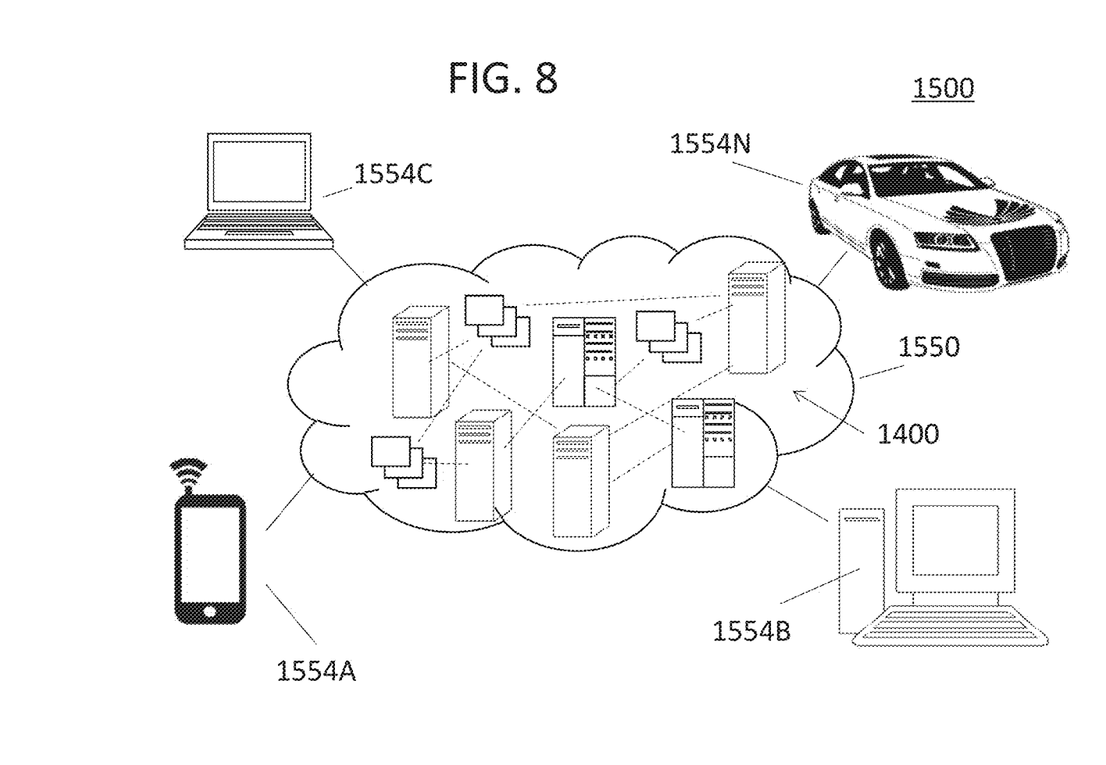
FIG. 8 depicts a cloud computing environment according to an embodiment of the present invention.

Referring now to FIG. 8, illustrative cloud computing environment 1550 is depicted. As shown, cloud computing environment 1550 includes one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 8 are intended to be illustrative only and that computing nodes 1400 and cloud computing environment 1550 can communicate with any type of computerized device over any type of network and/or network addressable connection (e.g., using a web browser).

Figure 9:
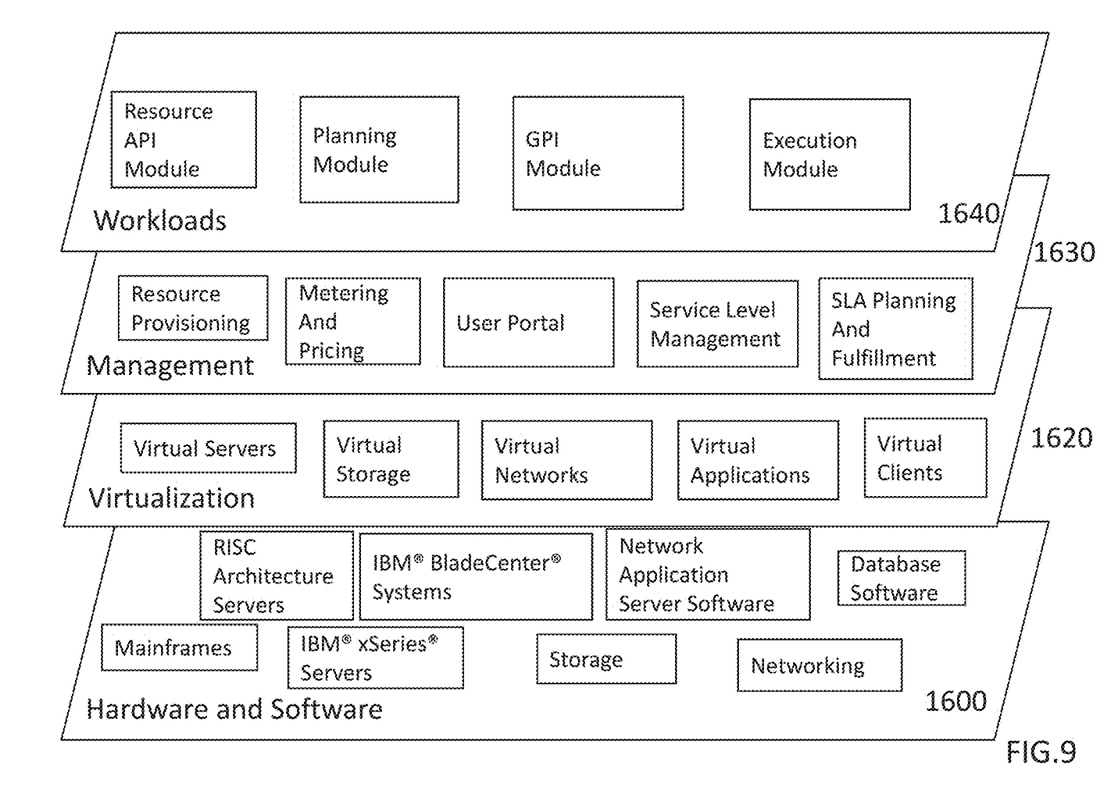
FIG. 9 depicts abstraction model layers according to an embodiment of the present invention.

Referring now to FIG. 9, a set of functional abstraction layers provided by cloud computing environment 1550 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM p Series® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the present invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. A method of tracking a plurality of objects, comprising:
obtaining input data;
estimating a number of skipping frames of the input data by using an inference model to learn the number of skipping frames based on detected objects' trajectories from the input data;
predicting results based on the estimating of the number of skipping frames; and
correcting the predicted results to perform multi-object tracking.

2. The method according to claim 1,
wherein the estimating of the number of skipping frames includes using tracklets based on co-occurrence of multiple parts of each of the plurality of objects, the tracklets including the trajectories.

3. The method according to claim 1, further comprising:
wherein the trajectories of tracklets are based on co-occurrence of multiple parts of each of the plurality of objects, and an output includes the estimated number of skipping frames.

4. The method according to claim 1,
wherein given an initialization in a first frame, extracting features in previous states and using the features to propose candidate object locations and identifies in later frames, and
wherein the input data includes trajectories based on co-occurrence of multiple parts of each of the plurality of objects.

5. The method according to claim 1,
wherein the input data is derived from sensors by recording images and performing measurements on objects, and
wherein the correcting the predicted result is via a correction network used to analyze tracking results and provide guidance for the correction of the predicted results.

6. The method according to claim 1, wherein the estimating includes estimating sensed physical entities from a plurality of measurements sensed from a plurality of sensors.

7. The method according to claim 6, wherein the estimating the sensed physical entities includes using initial estimates of the sensed physical entities from at least two measurements from the plurality of sensors, and correcting the entity and sensor status from previous results.

8. The method according to claim 1, wherein the estimating includes estimating object states jointly over time, and estimating sensed physical entities based on outputs of a plurality of sensors.

9. The method according to claim 1 being cloud implemented.

10. A system for tracking multiple objects, comprising:
a network including:
a memory storing computer instructions; and
a processor configured to execute the computer instructions to:
obtain input data;
estimate a number of skipping frames of the input data by using an inference model to learn the number of skipping frames based on detected objects' trajectories from the input data;
predict results based on the estimating of the number of skipping frames; and
correct the predicted results by interpolation to perform object tracking.

11. The system according to claim 10, wherein the processor is further configured to execute the computer instructions to linearly interpolate the predicted results,
wherein the estimating of the number of skipping frames includes using tracklets based on co-occurrence of multiple parts of each of the multiple objects, the tracklets including the trajectories.

12. The system according to claim 10,
wherein given an initialization in a first frame, extracting features in previous states and using the features to propose candidate object locations and identifies in later frames, and
wherein the input data includes trajectories of tracklets that are based on co-occurrence of multiple parts of each of the plurality of objects, and output includes a corrected number of skipping frames, the tracklets including the trajectories.

13. The system according to claim 10,
wherein the input data is derived from a plurality of sensors by recording images and performing measurements on objects,
wherein the estimating includes estimating sensed physical entities from a plurality of measurements sensed from the plurality of sensors.

14. The system according to claim 10,
wherein the estimating includes estimating object states jointly over time, wherein the correcting the predicted result is via a correction network used to analyze tracking results and provide guidance for the correction of the predicted results, and wherein the estimating the number of skipping frames of the input data is based on information including a predetermined criteria comprising a path of at least one of the plurality of objects from the input data.

15. A computer program product comprising a computer readable storage medium having program instructions embodied therewith, the program instructions readable and executable by a computer to cause the computer to perform a method, comprising:

obtaining input data;

estimating a number of skipping frames of the input data by using an inference model to learn the number of skipping frames based on detected objects' trajectories from the input data;

predicting results based on the estimating of the number of skipping frames; and correcting the predicted results to perform multi-object tracking.

16. The computer program product according to claim 15, the method further comprising linearly interpolating the predicted results, wherein the estimating of the number of skipping frames includes using tracklets based on co-occurrence of multiple parts of each of the plurality of objects, the tracklets including the trajectories.

17. The computer program product according to claim 15, wherein the input data is derived from a plurality of sensors by recording images and performing measurements on objects, wherein the estimating of the number of skipping frames includes estimating sensed physical entities from a plurality of measurements sensed from the plurality of sensors, and assuming initial estimates of the sensed physical entities from the plurality of sensors, and correcting the sensed physical entities and sensor status from previous results, and wherein the input data includes trajectories of tracklets that are based on co-occurrence of multiple parts of each of the plurality of objects, and the output includes a corrected number of skipping frames, the tracklets including the trajectories.

18. The computer program product according to claim 15, wherein the estimating includes estimating object states jointly over time, and wherein the correcting the predicted result is via a correction network used to analyze tracking results and provide guidance for the correction of the predicted results.

* * * * *